United States Patent
Baldwin et al.

(10) Patent No.: US 9,559,842 B2
(45) Date of Patent: Jan. 31, 2017

(54) TRUSTED KEY MANAGEMENT FOR VIRTUALIZED PLATFORMS

(75) Inventors: Adrian John Baldwin, Bristol (GB); Chris I. Dalton, Bristol (GB)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 1260 days.

(21) Appl. No.: 12/242,104

(22) Filed: Sep. 30, 2008

(65) Prior Publication Data
US 2010/0082991 A1   Apr. 1, 2010

(51) Int. Cl.
H04L 9/32 (2006.01)
H04L 9/08 (2006.01)

(52) U.S. Cl.
CPC ......... *H04L 9/083* (2013.01); *H04L 2209/805* (2013.01)

(58) Field of Classification Search
CPC ............... H04L 9/0877; H04L 9/0897; H04L 2209/127; G06F 21/62
USPC ........................................................ 713/176
See application file for complete search history.

(56) References Cited

U.S. PATENT DOCUMENTS

| | | | | |
|---|---|---|---|---|
| 6,118,870 A * | 9/2000 | Boyle | ............... | H04L 9/0625 380/200 |
| 8,151,262 B2 * | 4/2012 | Challener | ............... | G06F 21/57 713/164 |
| 2002/0120876 A1 * | 8/2002 | Pearson et al. | ............... | 713/201 |
| 2002/0194482 A1 * | 12/2002 | Griffin et al. | ............... | 713/176 |
| 2003/0147267 A1 * | 8/2003 | Huttunen | ............ | G06F 21/6209 365/63 |
| 2004/0103299 A1 * | 5/2004 | Zimmer et al. | ............... | 713/200 |
| 2004/0230794 A1 * | 11/2004 | England et al. | ............. | 713/164 |
| 2005/0223221 A1 | 10/2005 | Proudler et al. | | |
| 2005/0278527 A1 * | 12/2005 | Liao et al. | ............... | 713/165 |
| 2006/0070066 A1 * | 3/2006 | Grobman | ............... | 718/1 |
| 2008/0005791 A1 * | 1/2008 | Gupta et al. | ............... | 726/15 |
| 2008/0046581 A1 * | 2/2008 | Molina | ............... | H04L 63/08 709/229 |

(Continued)

OTHER PUBLICATIONS

Anderson et al., "Towards Trustworthy Virtualisation Environments: Xen Library OS Security Service Infrastructure," Hewlett-Packard Development Company, L.P., 2007, 16 Sheets.

(Continued)

*Primary Examiner* — Esther B Henderson
(74) *Attorney, Agent, or Firm* — Hewlett Packard Enterprise Patent Department

(57) ABSTRACT

To provide a secure service to an application virtual machine running in a first domain of a virtualized computing platform, a second domain is arranged to run a corresponding service driver exclusively for the application virtual machine. As part of the secure service, the service driver effects a key-based cryptographic operation; to do so, the service driver has to obtain the appropriate key from a key manager. The key manager is arranged to store the key and to release it to the service driver only upon receiving evidence of its identity and being satisfied of compliance with release policies associated with the key. These policies include receipt of valid integrity metrics, signed by trusted-device functionality of the virtualized computing platform, for the service driver and the code on which it depends.

20 Claims, 8 Drawing Sheets

(56) References Cited

U.S. PATENT DOCUMENTS

2009/0154709 A1* 6/2009 Ellison ................... H04L 9/083
　　　　　　　　　　　　　　　　　　　　　380/282
2009/0292919 A1* 11/2009 England ............... H04L 9/0897
　　　　　　　　　　　　　　　　　　　　　713/168

OTHER PUBLICATIONS

Baldwin et al., "Encryption and Key Management in a SAN," Hewlett-Packard Laboratories, 10 Sheets.
Barham et al., "Xen and the Art of Virtualization," University of Cambridge Computer Laboratory, Oct. 2003, 14 Sheets.
Berger et al., "IBM Research Report—vTPM: Virtualizing the Trusted Platform Module," IBM Research Division, Computer Science, Feb. 14, 2006, 17 Sheets.
Stumpf et al., "A Robust Integrity Reporting Protocol for Remote Attestation," Darmstadt University of Technology, Department of Computer Science, 12 Sheets.

* cited by examiner

TRUSTED KEY MANAGEMENT FOR VIRTUALIZED PLATFORMS

FIELD OF INVENTION

The invention relates to a method and apparatus for providing secure services in a virtualized computing system and in particular to trusted key management for virtualized platforms.

BACKGROUND OF INVENTION

Off-platform data storage is a service frequently used by an application running on a computing platform. With modern networked computer systems, off-platform data storage does not exist in an isolated environment along with the platform it serves; instead the platform and storage are linked through a network. Indeed, in general a network-connected storage system will provide off-platform data storage for multiple computing platforms.

In a storage area network (SAN) multiple storage devices provide off-platform data storage for multiple computing platforms. SANs meet a number of IT managers' needs in that they provide a flexible and manageable storage infrastructure. They are designed to support hundreds to thousands of devices providing high performance, backup, and high availability and as such provide a powerful storage infrastructure for business critical functions. This means that SAN systems will hold large amounts of business critical data which in turn implies some severe security requirements. There is also a trend of relying on contractors, outsourced system management and even hosting systems in third party data centres which all combine to mean great care should be taken with protecting data against internal and external attacks as well as accidental leaks.

SAN networks connect every computer (server) to every storage device bringing obvious security concerns. Each server is configured to talk to particular disks with in the SAN system. Typically, fabric level security is used to divide disks into zones or uses LUNs on large RAID systems and the SAN switching fabric is then relied upon to separate these zones. This can be done either using soft zoning (based on a name server) or hard zoning in the switches. Security can also be provided at the storage device level where machines have to be granted access to each storage device. These security techniques provide a broad segregation of data at the device level stopping unauthorised access to the data. However, such techniques are by themselves inadequate for several reasons: firstly, the administrators can reconfigure the SAN system such that a malicious insider could add an extra machine to gain unauthorised data access; secondly, the data is not encrypted over the network connection between the disks and servers which opens up possibilities of data leaking or being inserted; thirdly, the data remains unencrypted on the disks within a data centre, and on associated backups leaving potential for leakage.

One solution to these problems is disclosed in the paper "Encryption and key management in a SAN", A. Baldwin and S. Shiu, SISW '02: Proceedings of the First International IEEE Security in Storage Workshop, page 35, Washington, D.C., USA, (2002)IEEE Computer Society. This paper describes how encryption and a strong key management scheme can help tighten security in a SAN system. The approach adopted in the paper is illustrated in FIG. 9 of the accompanying drawings. FIG. 9 shows a SAN in which servers 90 are connected through the SAN fabric 91 (including a switch 92) to a storage pool 93 made up of a plurality of storage devices. Each server 90 is provided with a secure hardware bus adaptor (SHBA) 94 which is provided with a respective encryption/decryption key from a key manager 95. Data to be stored by a server 90 to the storage pool 93 is encrypted by the associated SHBA 94 before being transferred over the network; the data is thus transferred and stored in encrypted form and when retrieved to the server 90, the encrypted data is decrypted by the SHBA 94.

The foregoing arrangement works well for the case of each server being dedicated to one specific user; however, modern data centers are, for reasons of efficiency and flexibility, virtualized environments. A virtualized data centre is a data centre that uses virtualization mechanism to share resources (computing platforms, storage etc.) between its many customers.

FIG. 10 of the accompanying drawings illustrates the typical configuration of a virtualized data centre providing data storage. On the right-hand side of the Figure, virtualization is used on each server (physical computing platform) 100 to create a number of Virtual Machines ($VM_1$ to $VM_i$) each running in its own domain on top of a virtual machine monitor VMM (a.k.a. 'hypervisor') 101 that ensures isolation of the domains. Each VM runs its own separate guest operating system and is under the illusion that it is the only machine using the hardware resources of the system. In fact, the guest operating system of each VM cannot access the physical resources directly but only through the privileged management domain 'DOM-0' 102 (domain number zero) with which it can interact through the Virtual Machine Monitor (VMM).

The customers of the data centre hire the virtual machines and connect to them using virtual private networks (VPN) in order to use the facilities provided by the data centre. In the present illustrated example, an iSCSI storage resource 104 is accessible to the VMs via an iSCSI initiator 103 run in DOM-0. The storage resource 104 (here shown as an array of disks 1 to n) is also virtualized, thereby providing virtual disks (VDisks 1 to m), which are mapped to the physical disks. Virtual disks are then assigned to individual virtual machines. Each virtual machine sees a virtual block device which appears to it as a local disk. This is mapped to a device driver (iScsi initiator 103) within Dom0 which interacts with the iScsi storage resource 104 providing the virtual disk.

A Utility Management System (UMS) 107 is responsible for setting up the virtual resources requested by customers. For example, for a specified client, the UMS 107 might ask iSCSI storage resource 104 to create a virtual disk and once a disk has been created, it requests a physical host to set up a virtual machine for using the newly created virtual disk. Since the data stored on iSCSI storage target is not encrypted, not only the owner of the data but also other entities, for example administrator of iSCSI storage target or an eavesdropper, can read the actual contents of the stored data.

For secure storage in a virtualized data centre, the data sent to the storage resource 104 should be encrypted. However, the solution discussed above of using a respective secure hardware bus adaptor for each machine is not practical when extended into a virtualized environment as it would require a respective secure hardware bus adaptor for each potential virtual machine. Furthermore, an alternative approach of providing for encryption/decryption in each virtual domain makes the keys used (and therefore the encrypted data) vulnerable to security weaknesses in the guest operating system and applications running in the domain. Indeed, encryption-based data security in a virtualized data centre relies on having key management solutions that are at least as strong as the other parts of the virtualized data center.

The last decade has seen the emergence of trusted computing platforms based a trusted secure hardware device known as a Trusted Platform Module (TPM). For virtualized environments, the hardware TPM may be supplemented by one or more software (a.k.a. virtual) TPMs. A description of trusted computing principles, of a TPM, and of example trusted platforms is given in the Appendix hereto with reference to FIGS. 1 to 8 of the accompanying drawings.

A TPM incorporates cryptographic functionality; however, this functionality is specific to the role of the TPM in providing reliable integrity metrics of the associated computing platform. The cryptographic functionality of a TPM is not intended to provide bulk cryptographic services, such as encryption/decryption of data, to an application running on the platform.

An object of the present invention is to provide trusted key management in a virtualized system to facilitate the provision of cryptographic-based services such as secure networking and storage.

SUMMARY OF INVENTION

In one aspect, the invention provides apparatus comprising:
a virtualized computing platform adapted to provide plural independent domains including:
  a first domain running an application virtual machine, and
  a second domain running a service driver for providing a secure service exclusively to the application virtual machine in the first domain, the service driver being adapted to carry out a key-based cryptographic operation as part of the secure service,
  communication being permitted between the first and second domains; the virtualized computing platform including trusted-device functionality for reliably measuring and reporting integrity metrics of program code installed on the platform; and
a key manager arranged to store a cryptographic key specific to the provision of the secure service to the application virtual machine in the first domain, and to release the key to the service driver in the second domain only upon receiving evidence of its identity and being satisfied of compliance with release policies associated with the key, these policies comprising receipt of valid integrity metrics, signed by the trusted-device functionality, for the service driver and the program code on which it depends.

BRIEF DESCRIPTION OF THE DRAWINGS

Embodiments of the invention will now be described, by way of non-limiting example, with reference to the accompanying diagrammatic drawings of the prior art and of embodiments of the invention, in which.

DETAILED DESCRIPTION OF EMBODIMENTS OF THE INVENTION

Figure 11:
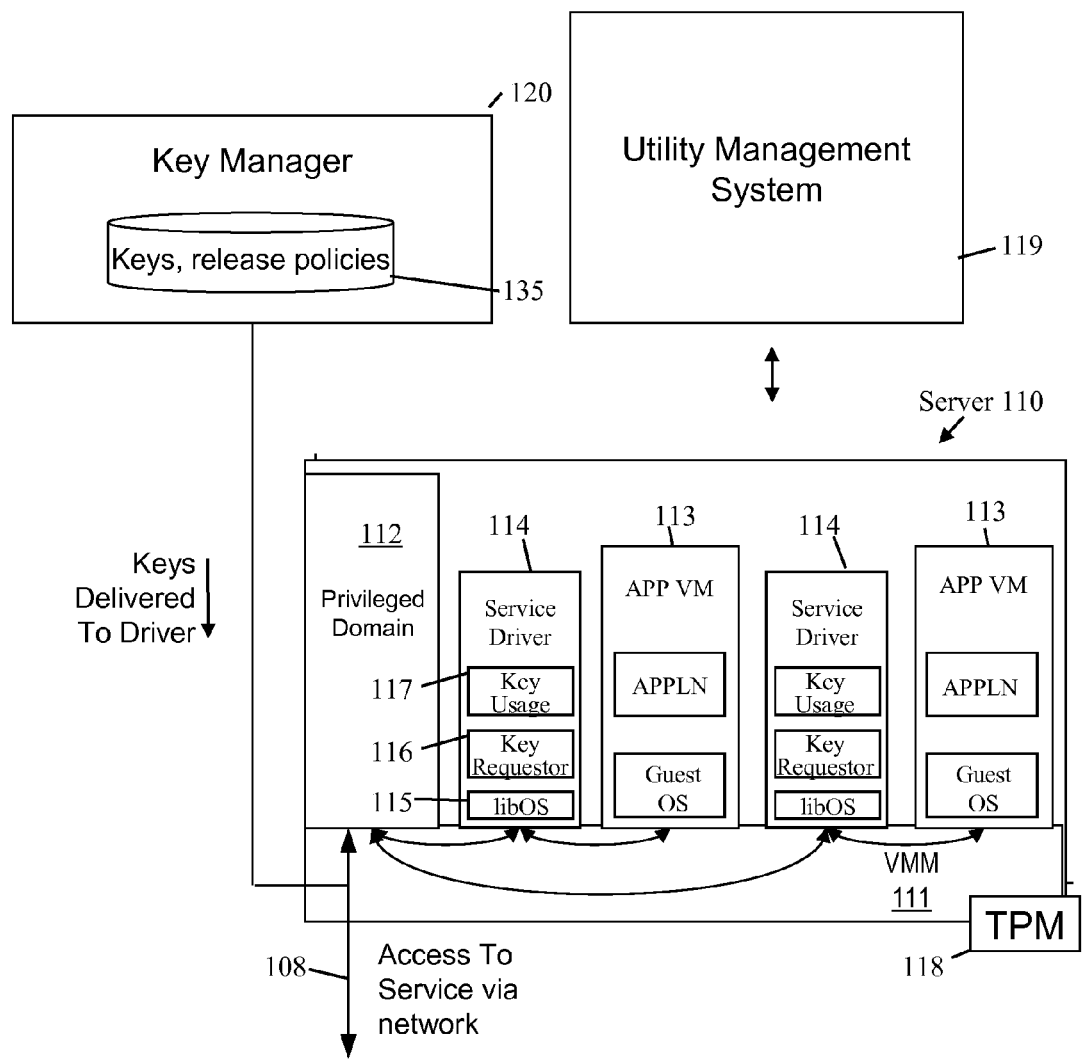
FIG. 11 is a diagram of a virtualized data center embodying the present invention and including a virtualized server and a key manager.

FIG. 11 shows the basic architecture of a data center, embodying the invention, that provides for the delivery of a secure service to a virtual machine established on a virtualized platform. The service is one involving the use of a cryptographic key (for example, and without limitation, an encrypted storage service). An important element in providing such a secure service is key management.

The FIG. 11 data center comprises:
Virtualized Platform 110 here shown as a server;
Utility Management System (UMS) 119 that is responsible for taking customer requests and setting up the system to provide appropriate virtual resources to meet the customer's needs. The UMS 119 could be part of an automated configuration arrangement or a more manual arrangement taking commands from administrators; and
Key Manager 120 that is responsible for creating, storing and managing keys used by secure services provisioned for customers on the virtualized platform 110 as specified by the UMS 119. The key manager 120 includes secure storage 135 for storing keys and associated policies including release policies.

The virtualized platform 110 comprises a hardware computing platform running program code that provides the following main functional elements:
A virtual machine monitor, VMM, 111 such as Xen for providing isolated domains and enabling controlled inter domain communication.
A privileged domain 112 (a.k.a. 'Domain 0') running management code for controlling, in dependence on input from the UMS 119, how the platform is configured, including which domains can communicate with each other; the privileged domain also regulates network access 108.
One or more application virtual machines VM 113 each established in a respective domain and comprising a guest OS and a related application(s). Each application VM 113 is an untrusted component in that it is assumed to be outside of the control of the data center management. An application VM may require use of one or more secure services (such as secure storage).
One or more secure service drivers 114. For each secure service available to an application VM 113, there is a respective secure service driver 114, specific to the VM 113 concerned, running in its own domain. The secure service driver 114 is arranged to carry out a cryptographic, key-based, operation (such as data encryption/decryption). As the secure service driver 114 is trusted with keys relevant to the service being provided, it needs to be trustable and therefore has a minimal code base which is arranged to be measured using trusted computing (in this example, TCG) mechanisms. The secure service driver 114 functionally comprises:

- a minimal OS 115 such as the library OS described in the paper "Towards Trustworthy Virtualisation Environments: Xen Library OS Security Service Infrastructure" Melvin J. Anderson, Micha Moffie, Chris I. Dalton; HP Laboratories, HPL-2007-69; herein incorporated by reference;
- a key requester module 116 for requesting keys from the key manager 120 and managing them locally; and
- a key usage module 117 for carrying out the cryptographic key-based operation associated with the secure service.

A Trusted Platform Module, TPM, 118. A hardware TPM is bound to the platform hardware along with a suitable BIOS containing a core root of trust for measurement thereby providing a mechanism for obtaining and reporting integrity metrics for platform components. See the Appendix for a general overview of trusted computing and the role of the TPM. As explained in the Appendix hereto with reference to FIG. 8, a respective virtual TPM (trusted device) that is subsidiary to the hardware TPM, may be associated with each domain to measure and report integrity metrics for the code running in the domain; however, it is alternatively possible to arrange for the platform hardware TPM to measure and report domain integrity metrics. Hereinafter, for convenience, reference will simply be made to integrity metrics measured and reported by trusted-device functionality, it being understood that this encompasses both the case where the hardware TPM 118 measures and reports all integrity metrics, and the case where some of the integrity metrics are measured and reported by virtual TPMs.

The general manner of working is that the UMS 119 is responsible for controlling the provision of resources to meet a customer's needs. Thus the UMS 119 will typically instruct the privileged domain to set up one or more customer-specific application VMs 113 each in its own domain. Where the customer requires a secure service for one of its application VMs, the UMS 119 also causes the privileged domain to establish a corresponding service driver 114 in its own domain and to associate this domain with the corresponding application VM domain such as to permit communication between these domains. The UMS 119 also informs the key manager 120 that a secure service is to be provided to a particular customer VM 113 and the key manager 120 then proceeds to generate a cryptographic key for the corresponding service driver 114. The key manager 120 securely stores this key for release upon satisfaction of conditions specified in a policies associated with the key; these policies are, for example, specified by the customer or by a system administrator. To ensure a key is only released into a trusted environment, one policy is that release is only upon the provision of satisfactory integrity metrics by the trusted-device functionality of the appropriate platform. In due course, when the application VM 113first seeks to use the secure service, the key requester module 116 of the service driver 114 requests the key from the key manager 120 and, assuming the associated policy conditions/integrity metrics are satisfied, the key is released to the service driver.

The key usage module 117 then uses the key to provide the required service, destroying the plain text form of the key after use. The service driver 114 does, however, securely store a local copy of the key for subsequent use in providing the secure service to the associated customer VM 113; for example, the key is stored to/retrieved from Protected Storage of the trusted-device functionality using the Seal/Unseal command (see FIG. 7 and related description in the Appendix regarding Protected Storage). In due course, the customer VM 113 and its associated service driver(s) will be destroyed (at the instigation of the UMS 119); the service driver may, of course, be destroyed before the VM if the latter ceases to have a need for the secure service. Notwithstanding destruction of the service driver and VM, the key for the secure service remains available for later use by the same customer as it is securely stored in the key manager 120.

It will be appreciated that a specific key is associated with a specific customer/secure-service combination and the key manager 120 must ensure that the key is only released to the service driver associated with that customer/secure-service combination. There are a number of ways in which this association can be established to key manager.

For example, the UMS 119 can inform the key manager 120 of the identity of the physical platform 110 and the service driver domain 114 associated with a specific customer/secure-service combination (the platform identity can be a public key of the platform hardware TPM 118). When the service driver requests its key, the identity of the requesting platform is readily established; furthermore, since the key request passes via the trusted privileged domain 112 of the platform, a reliable report of the domain originating the request can be provided to the key manager. Where each domain has an associated virtual TPM, the identity of the latter can be used as an alternative method of associating the service driver domain 114 with a specific customer/secure-service combination.

An alternative approach to establishing to the satisfaction of the key manager which key is associated with a key-requesting service driver is to specify this in a credential held by the corresponding virtual machine; in this case, the credential effectively serves to identify the service driver in terms of the key it is entitled to use.

As the requirements change for a given customer, they may make requests for changes in the policies on how a given key and associated service can be used. For example a key associated with a particularly sensitive storage device may only be released to a system with a trusted computing base containing all the recent critical patches—as a new patch is issued the policy could be changed. Finally, as the customer no longer needs the service the keys should be destroyed.

The overall lifespan of a key will depend on the nature of the secure service for which it is used; for example, a secure communication service may have transient keys whereas storage services will generally have long term keys whose loss could lead to the loss of data. Such long term keys are preferably backed up in some manner to survive failure of the key manager. Provision may also need to be made to transfer a long term key to a new version of the key manager or even to the key manager of a different data center.

It will be apparent that in the FIG. 11 system, key security depends, in particular, on the security of the service driver 114 and of the key manager 120. Further consideration of these elements is given below.

Taking the service driver 114 first, the following features contribute to its security:

Isolation of the service driver domain from the untrusted VM domains—this isolation is dependent on the VMM 111;

A small code base for the service driver (in particular, a lightweight OS) to facilitate the detection of any security flaws in the code;

The use of integrity metrics and trusted computing mechanisms for checking the integrity of the service driver 114 and the program code on which it depends, before a key is released to the service driver;

The use of TPM-based protected storage with the Seal/Unseal commands for local key storage.

Figure 13:
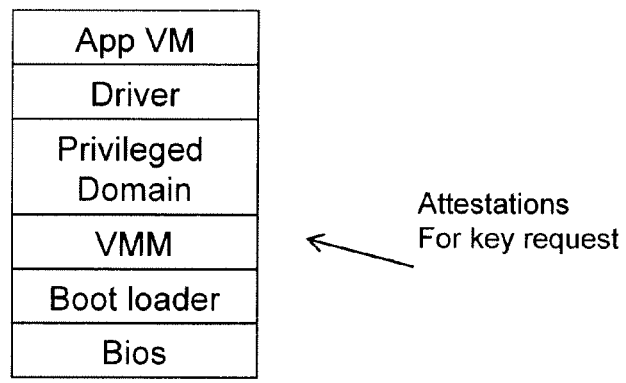
FIG. 13 is a depiction of the integrity metrics reported by a service driver associated with a virtual machine of the FIG. 11 virtualized server.

With regard to the use of integrity metrics, part of the role of the key requester module 116 is to obtain the metrics (PCR values) from the platform trusted-device functionality using the Quote command and pass these metrics and the associated SML log to the key manager 120. Since the security of the service driver is dependent on the environment provided by the VMM 111 and the privileged domain 112, the integrity metrics requiring to be reported to the key manager comprise, for example, the platform BIOS and boot loader, the VMM 111, the privileged domain 112, and the service driver 114 (see FIG. 13). Preferably, the application VM 113 using the service driver 114 should also be measured and its integrity metric reported by the key requestor module 116 to the key manager 120. The key manager 120 is responsible for validating the integrity metrics reported to it.

As already indicated, once the service driver 114 has received the key(s) it has requested, the service driver keeps an encrypted copy of the key(s) using the TPM protected storage sealing mechanism (provided either by a domain-specific virtual TPM or by the hardware TPM 118); this allows the service driver to overwrite the unencrypted key(s) when not in continuous use. The sealing mechanism also ties the keys to the service driver domain so that they cannot be accessed via other systems. The use of the sealing mechanism combined with a virtual TPM that allows migration could be used to allow the service driver to migrate along with the associated VM without reference back to the key manager but such an approach would depend on the details of a given virtual TPM implementation.

With regard to the key manager 120, this is, of course, a particularly sensitive component in that it stores and manages keys for multiple services over their full lifetime. This makes it a critical point of attack either in an attempt to gain access to the raw keys or to subvert the mechanism so that an adversary can successfully request keys are delivered to an inappropriate service delivery platform. A suitable architecture for the key manager 120 is described below, this architecture being intended to mitigate security risks through the use of a small known code base and separation provided by virtualization. It is assumed that that the key manager is running within a physically secure data center.

Figure 12:
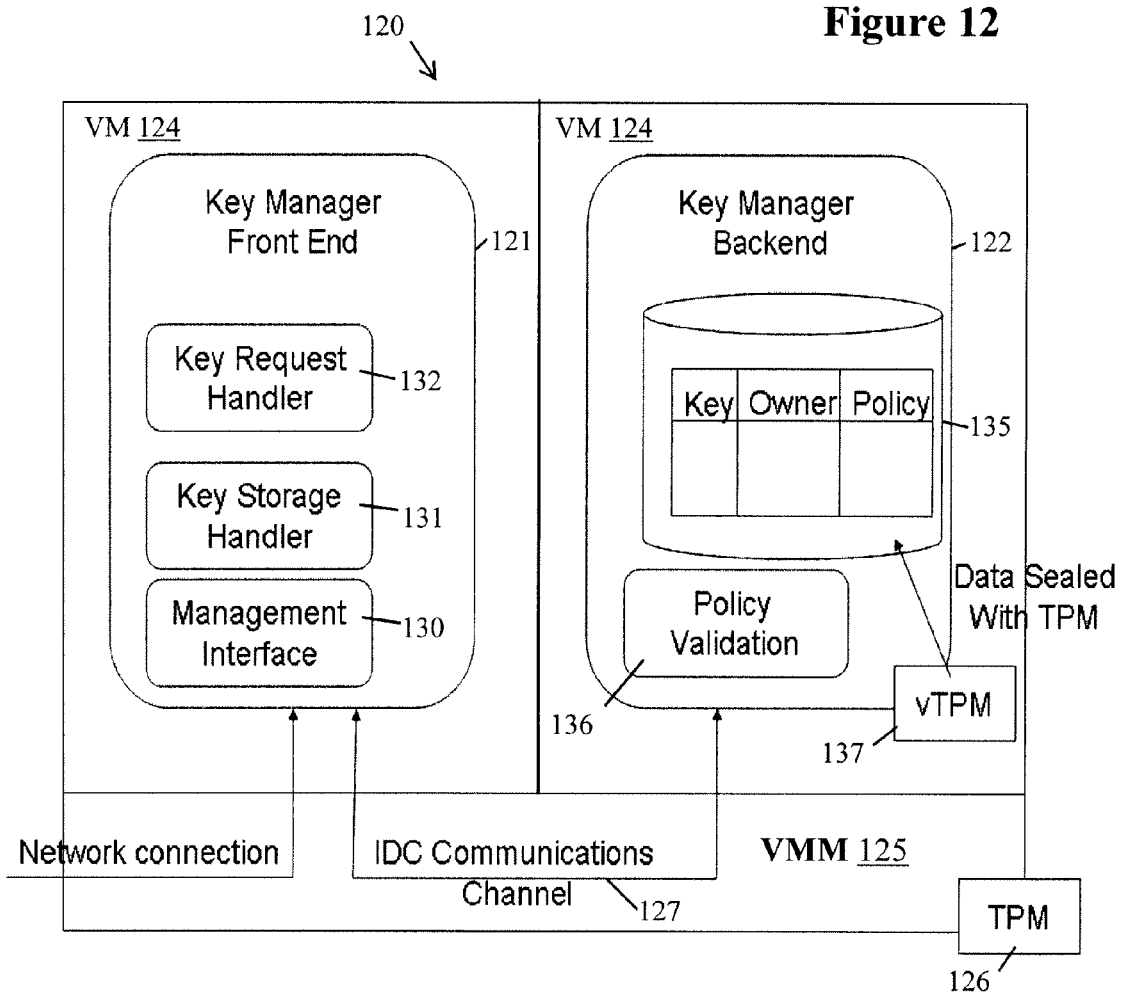
FIG. 12 is a functional block diagram of the key manager of FIG. 11.

As shown in FIG. 12, the key manager 120 is divided into two components, namely a front end 121 and a back end 122, each of which is contained within its own minimal virtual machine 124 on a virtualized platform that has a virtual machine manager VMM 125 and TPM 126. The key-manager front and back ends 121 and 122 can communicate through an inter domain communication channel 127. The role of the key-manager front end 121 is to manage external communications with key requester modules 116 (done by key request handler 132 in FIG. 12) and management systems (management interface 130), and to interact with the key-manager back end (key storage handler 131). The role of the key-manager back end 122 is to perform the trusted operations within the key manager as is more fully explained below. This general arrangement both reduces the chances of the trusted parts of the key manager (the back end 122) becoming subverted as they are not directly accessible on a network; it also helps in keeping minimize the code base of the trusted elements.

The key manager could itself be mirrored with an interchange protocol being used to communicate policy changes between multiple systems. Such mirroring would allow for high availability as required within a data center. The scope of the key manager can also be broken up so that a respective key manager could be run per customer or per service type. Running the key manager on a virtual platform means that it is easy to replicate and segment into different services.

The key manager preferably has an audit logging capability ensuring all key requests are logged.

Keys within the key manager 120 are managed and released to service drivers according to a set of policies and this is the responsibility of the key-manager back end 122. There are actually three sets of policies following from the different operations within the life-cycle of the keys. The first set of policies refers to the owner of the service protected by the keys and specify who can end the service or change the other policies. The second set of policies encompass information concerning the identity of the VM domains 113 that can be linked to a given service as defined by information supplied from the utility management system 119. The third set of policies concern the acceptable levels of trust required for the release of keys to a given service driver.

Keys need to be released to a service driver 114 for use with a given VM 113 domain and, as already discussed, this requires a unique identity for the VM domain, for example, based on the identity of an associated virtual TPM; where there is no simple mechanism of reliably binding a unique identity to a VM 113, it is necessary for the key manager 120 to have more detailed deployment information from the utility management system 119.

The third group of policies concern the definition of the trusted computing base that we are prepared to trust with a given set of keys or access to an associated service. On creation of a service the owner will have some idea as to the risk involved, for example, the based on understanding the impact of the leakage of data and from this they can select an appropriate required level of trust. The policies themselves define how to interpret the PCR values as supplied by the key requester module 116 (including measurements of the VM 113). These policies could simply contain the necessary chain of hash values from a known tested implementation so that the key-manager back end 122 can reconstruct the final PCR values by looking at this list and the SML information. Such an approach lacks flexibility and would lead to the need to update many policies as software versions change or as patches are issued.

Preferably, therefore, an indirection is introduced having white lists for different systems that define acceptable versions (and associated measurements) for each part of the software stack based on a given risk level. Some configuration measurements may be more specific to the task, for example, on measuring a VM 113 the measurements may be required to indicate that the configuration has only one network card.

Hence, policies can be made up by reference to white lists and by comparing configuration files against a known set of measurements. Whilst the white lists provide a degree of flexibility, they also create an additional trusted role, which could be taken by the service administrator or passed on to a trusted third party. Such a role would be responsible for ensuring white lists are up to date so that measurements of components with known vulnerabilities are removed and measurements including the latest patches and versions are included.

The task of policy validation within the key-manager back end 122 is carried out by a policy validation module 136. This module is responsible for interpreting the PCR values relayed to it, via the front end 121, from the key requester module 116 and comparing them to known values within the white lists to see if the values are correct and check that they represent a trusted component. The storage measurement log SML that details what has been measured and the measurement sequence help in this interpretation. Additional elements could be added into the policies, for example, a list of CAs (Certificate Authorities) trusted to endorse the attestation keys within the TPM (or virtual TPM) could be specified or location elements could be specified so that if the key manager 120 is supplied with a certified list of server locations it could check that a given server is within a safe physical boundary (i.e. a data center).

At the heart of the key-manager back end 122 is the database 135 containing keys, policies and the identity of the service to which they link. From a security perspective, it is not only important to keep the keys secure but it is also necessary protect the integrity of the policies and the binding between the keys, service identity and policies. The keys held within the key manager 120 should only be available to the key manager and those service driver domains to which they are shipped and hence the keys are 'sealed' in protected storage using the key-manager platform hardware TPM 126 or a virtual TPM 137 associated with the key-manager back end domain 124. The sealing process ensures that the keys are only available where the PCR registers are the same as those used in sealing the data. Therefore, by measuring the key-manager code up to the level of the key manager application, it is possible to ensure that the keys are only available to an application that can be trusted to handle them properly. The binding between the key, service and policies is critical to the security of the system and hence what is sealed is a combination of the key with the (SHA-1) hash of the service name and policy set. As part of the policy validation stage the integrity of the policy set for a given service is checked against this hash value.

The above-described design of the key manager 120 does not provide for persistent storage within the key manager back-end 122 and hence the key manager database including the sealed key and integrity check needs to be transferred to the key manager front-end for off-platform persistent storage. This presents an additional issue of ensuring that the keys provided to the key manager are fresh, that is, the current entry in the database cannot be replaced with an older version that may have a weaker policy. Preventing such replay attacks can be done by having an integrity check on the whole set of keys; this could simply be done by keeping a hash of the whole key database and ensuring that the key database matches this hash as it is loaded into memory. More efficient schemes can be based on hash trees (or other similar structures) that do not require the entire key database to be in memory at any point and reduce the effort of maintaining the overall integrity measure representing the set of data. The integrity measure will reside in memory whilst the key manager is running. Issues of freshness remain on restarting a given key manager where the root integrity measurement for the database could be sealed with freshness information derived from a management system or security officer. Where there are a replicated set of key managers the freshness should be derived by replicating the key database from a mirrored key manager and hence ensuring policy changes that occurred whilst the key manager has not been running are used.

Figure 14:
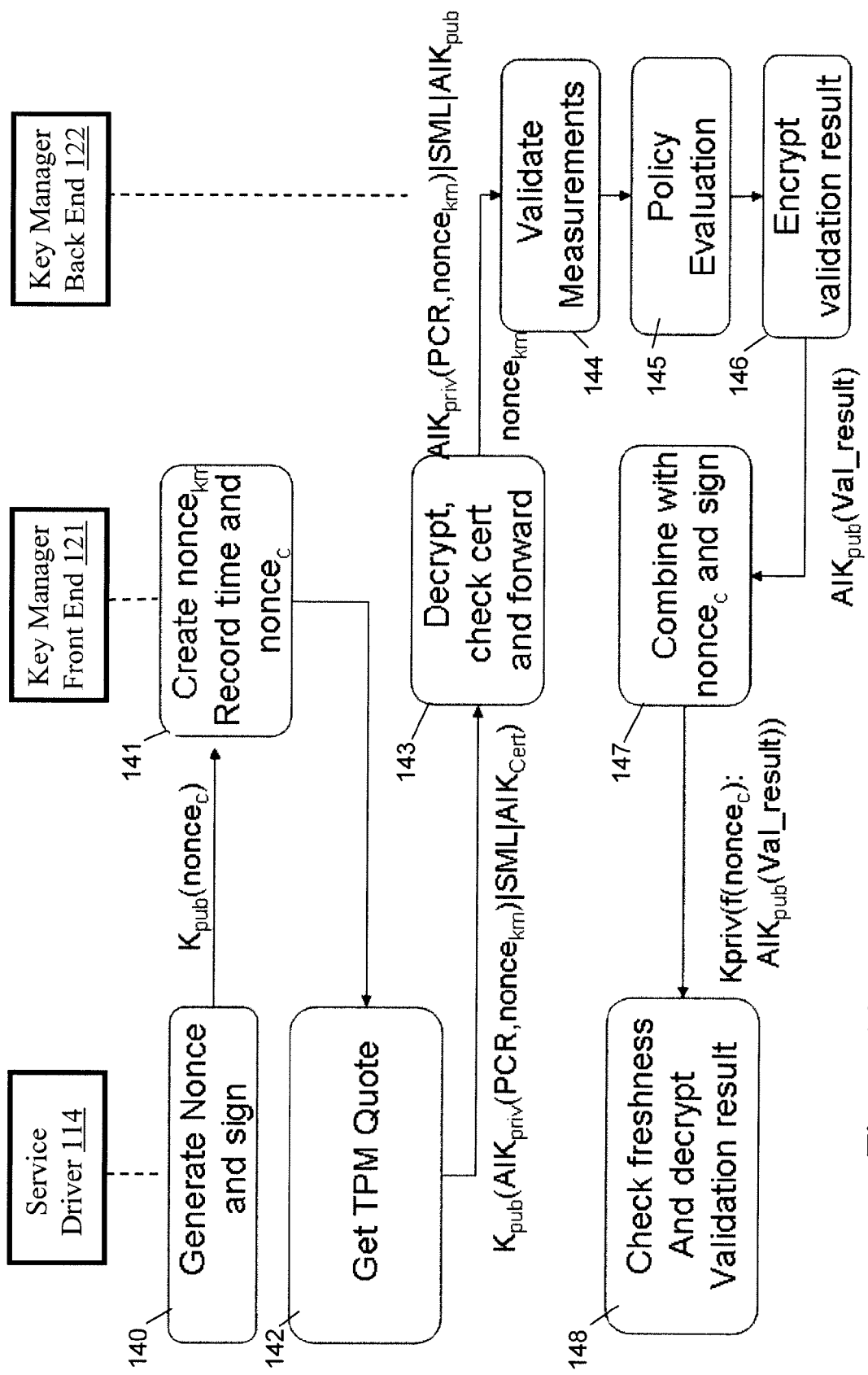
FIG. 14 illustrates an example key transfer protocol by which a service driver of the FIG. 11 virtualized server can request and receive a key from the key manager.

The protocol by which a service driver 114 requests and receives a key from the key manager 120 will now be described with reference to FIG. 14. This key transfer protocol is basically an extension of the attestation protocol described in the Appendix with respect to FIG. 6. In the following, the key manager 120 is assumed to have a public/private key pair $K_{pub}/K_{priv}$ and the relevant integrity metrics (those listed in FIG. 13) for the virtualized platform 110 are held by trusted-device functionality that has an Attestation Identity Key, AIK, key pair $AIK_{pub}/AIK_{priv}$ (as previously noted, more than one TPM, and therefore more then one AIK, may be involved). The key transfer protocol comprises the following steps:

Step 140 the key requester module 116 of the service driver 114 initiates a request by generating a nonce 'nonce$_c$', signing it using the public key $K_{pub}$ of key manager 120, and sending the result to the key manger 120.

Step 141 the key-manager front end 121 stores the nonce 'nonce$_c$' along with the arrival time (this is used to ensure freshness and timeliness); the key-manager front end 121 generates and returns a nonce 'nonce$_{km}$'.

Step 142 the key requester module 116 uses a TPM Quote operation to obtain a set of PCR measurements signed by the trusted-device functionality with its private key $AIK_{priv}$; the key requester module 116 concatenates this signed structure with the system measurement log SML and AIK certificate and encrypts the resultant combination under the public key $K_{pub}$ of the key manger to form an encrypted package which it sends to the key manager.

Step 143 the key-manager front end 121 decrypts the package and checks the AIK certificate (for example, for revocation). The decrypted package is then passed onto the key-manager back end 122.

Step 144 the key-manager back end 122 validates the PCR measurements received from the trusted-device functionality;

Step 145 the key-manager back end 122 then performs the policy validation described earlier. This leads to a validation result 'Val_result' that is either a key along with any additional usage policies that the driver domain is trusted to enforce, or it is an error message.

Step 146 The key-manager back end 122 uses the AIK public key $AIK_{pub}$ to encrypt the validation result 'Val_result' for decryption by the trusted-device functionality associated with the key requester module 116; the encrypted validation result is passed to the key-manager front end 121.

Step 147 the key-manager front end 121 forms a package from a concatenation of the encrypted validation result and a copy of the original nonce 'nonce$_c$' (or an agreed transformation 'f(nonce$_c$)' of the nonce); this package is then signed with the key $K_{priv}$ and sent to the key requestor module 116.

Step 148 The key requester module 116 validates the package it receives from the key manager 120 and matches the initial request (based on 'nonce$_c$'); the encrypted validation result is then sent to the trusted-device functionality for decryption.

One example of a secure service provided to an application VM 113 by a service driver 114 is secure storage, the service driver using the key(s) released by the key manager to encrypt/decrypt data on its way from the VM 113 to off-platform storage (such as a virtual disk)with which the virtualized platform 110 connects via network access 108. The above-described system uses a small trusted computing base where encryption/decryption is managed within a storage driver domain and the storage keys are managed and distributed by a simple key manager. This not only helps mitigate threats from mis-configuration but also reduces the likelihood that the key is lost through a subverted OS.

The above-described approach for secure service provision in a virtualized environment is equally valid for other services and not just for off-platform data storage. Examples include:

using the key manager to set up encrypted network links between VM domains 113 by having the service driver act as part of a virtual switch, the service driver having been supplied by the key manager with a key allowing it to join a VLAN; or to provide an encrypted link for a secure console device.

providing an audit service for securely off loading log files where the service driver uses keys to seal the log files.

Although in the foregoing, the trusted computing mechanisms have been described in terms of the architecture and command set employed by the Trusted Computing Group, it is to be understood that the present invention is not limited to this particular implementation of trusted computing principles.

Appendix—Trusted Computing

This Appendix forms an integral part of the present specification. In the present context "trust" is the expectation that a device will behave in a particular manner for a specific purpose, and, a "user" can be a local user or a remote user such as a remote computing entity.

A significant consideration in interaction between computing entities is trust—whether a foreign computing entity will behave in a reliable and predictable manner, or will be (or already is) subject to subversion. Trusted systems which contain a component at least logically protected from subversion have been developed by the companies forming the Trusted Computing Group (TCG). The TCG develops specifications in this area, for example the "TCG TPM Specification" Version 1.2, which is published on the TCG website <https://www.trustedcomputinggroup.org/>. The implicitly trusted components of a trusted system enable measurements of a trusted system and are then able to provide these in the form of integrity metrics to appropriate entities wishing to interact with the trusted system. The receiving entities are then able to determine from the consistency of the measured integrity metrics with known or expected values that the trusted system is operating as expected.

An overview of the main features of a trusted platform is given below followed by a description, with reference to FIGS. 1 to 8, of two example prior-art trusted computing platforms. The specifics of the described prior-art trusted computing platforms are not intended to limit the scope of the present invention unless otherwise stated.

General Characteristics of a Prior-Art Trusted Platform

A trusted computing platform provides for trustable platform integrity measurement and reporting, and to this end has a plurality of shielded locations, that is, places (memory, registers, etc.) where it is safe to operate on sensitive data. Integrity measurement is the process of obtaining integrity metric measurements of a platform (that is, measurements of platform characteristics that affect the integrity—trustworthiness—of the platform) and putting the measurements (here taken to encompass derivative values such as digests) into shielded locations; in TCG parlance, the shielded locations used for storing integrity metrics are referred to as Platform Configuration Registers or "PCRs" and this terminology will be used hereinafter. The values held in the PCRs are reportable integrity metric values. Integrity reporting is the process of attesting to integrity metrics recorded in PCRs in a way that associates the metrics with the platform concerned. A trusted computing platform may also provide, in addition to shielded locations, trustable storage for securely storing data in encrypted form and for ensuring that access to this data only occurs in a named environment. The foregoing trusted features will normally involve the use of cryptographic functions.

A user can verify the correct operation of a trusted computing platform, for example, before exchanging data with the platform, by requesting the trusted platform to provide one or more integrity metrics. The user receives the integrity metric or metrics, and compares them against values which it believes to be true (these values being provided by a trusted party, TP that is prepared to vouch for the trustworthiness of the platform or by another party the user is willing to trust). If there is a match, the implication is that at least part of the platform is operating correctly, depending on the scope of the integrity metric. If there is no match, the assumption is that the entire platform has been subverted and cannot be trusted (unless isolation technologies are employed to restrict the scope of what cannot be trusted).

Once a user has established trusted operation of the platform, he exchanges data with the platform. For a local user, the exchange might be by interacting with some software application running on the platform. For a remote user, the exchange might involve a secure transaction. In either case, the data exchanged is preferably 'signed' volatile by the trusted platform. The user can then have greater confidence that data is being exchanged with a platform whose behaviour can be trusted. Data exchanged may be information relating to some or all of the software running on the computer platform.

Trusted Entity Providing for Roots of Trust

In order to impart to a computing platform the characteristics of a trusted computing platform, it is necessary to provide the platform with certain inherently trustable functionalities (collectively making up what is herein referred to as a "trusted entity") which are is physically or logically bound to the platform and operate, together with elements of the computing platform, to provide the desired trusted characteristics (minimally, integrity measurement and reporting). In effect, the trusted entity provides the platform with 'roots of trust' and an example of this is given below.

For trusted platforms following the TCG Specifications, the trusted entity is called a Trusted Platform Module ("TPM") and serves to provide, together with elements of the computing platform to which the trusted entity is bound, the following "roots of trust":

A root of trust for measurement (RTM),—the RTM is a computing engine capable of making inherently reliable integrity measurements and is typically the normal platform computing engine (main processor) controlled by the so-called core root of trust for measurement (CRTM), that is the instructions executed by the platform when it acts as the RTM. The CRTM is logically part of the aforesaid trusted entity and would ideally be included in the TPM but for cost reasons is usually implemented by a separate ROM.

A root of trust for storage (RTS)—the RTS is a computing engine capable of maintaining an accurate summary in PCRs of values of integrity measurement digests; the RTS may also provide for 'protected storage' serving to protect data (frequently keys) held in external storage devices as opaque "blobs" and 'sealed'/'unsealed' for access by the RTS against a particular environment (as indicated by PCR values).

A root of trust for reporting (RTR)—the RTR is a computing engine responsible for establishing platform identities, reporting platform configurations (PCR values), protecting reported values and establishing a context for attesting to reported values. The RTR shares responsibility of protecting measurement digests with the RTS.

It may be noted that, as indicated above, the elements forming the RTM are typically (though not necessarily) outside a TPM; in contrast, the RTS and RTR are normally provided by the TPM itself.

Generally, any trusted platform will provide such roots of trust (though possibly in a different conceptual arrangement).

A trusted entity can be embodied as a hardware device (which may include a program-controlled processor) or in software for execution by a main processor of the platform (in which case it is usually referred to as a 'virtual' trusted entity/device or in the case of a TPM, a virtual TPM). In practice, virtual trusted entities are normally provided on platforms that have a basic hardware trusted entity for the basic platform environment but which employ further trusted entities for virtual environments created on the platform. A hardware trusted entity is usually physically bound to the platform with which it is associated whereas a software trusted entity is logically bound to the platform with which it is associated.

It is, of course, also possible to implement a trusted entity as a combination of hardware device and software intended for execution on the platform; where the trustworthiness of the software can be established by a chain of trust rooted in the RTM.

The functionality of the trusted entity can be distributed between multiple devices (in the case of a hardware embodiment) or code blocks (in the case of a 'virtual' embodiment).

The trusted entity uses cryptographic processes but does not necessarily provide an external interface to those cryptographic processes. The trusted entity should be logically protected from other entities —including other parts of the platform of which it is itself a part. Also, most desirable implementations provide the trusted entity with protective features to protect secrets stored by or being processed by the trusted entity by making them inaccessible to other platform functions, and provide an environment that is substantially immune to unauthorised modification.

For a hardware embodiment, the trusted entity, therefore, preferably consists of one physical component that is tamper-resistant. Techniques relevant to tamper-resistance are well known to those skilled in the art of security. These techniques include methods for resisting tampering (such as appropriate encapsulation of the trusted entity), methods for detecting tampering (such as detection of out of specification voltages, X-rays, or loss of physical integrity in the trusted entity casing), and methods for eliminating data when tampering is evident. As regards a 'virtual' trusted entity, although software may not afford such a high degree of tamper-resistance as a hardware device, this may be compensated for by additional protection measures. For example, the software code may include self-test functions, to check the integrity of the trusted functionality.

Chain of Trust—The trustable integrity measurement and reporting enabled by the presence of the trusted entity in the platform typically enables trust to be placed in other platform components or functions which in turn perform trustable integrity measurement of further platform components or functions and so on. This process of extending the boundary of what is trustable is called "transitive trust" and can be thought of as establishing a chain of trust rooted in the platform's roots of trust. Thus in a typical example:

the trusted code for effecting an initial integrity measurement (the CRTM in TCG parlance) serves to measure an integrity metric of OS loader code to enable trust to be placed in this code (if the metric match the expected value);

the OS loader code in turn determines an integrity metric for Operating System code to enable trust to be placed in the operating system;

the operating system in turn determines an integrity metric for application code to enable trust to be placed in the application.

FIRST EXAMPLE

Prior-Art Trusted Platform—Overview

Figure 1:
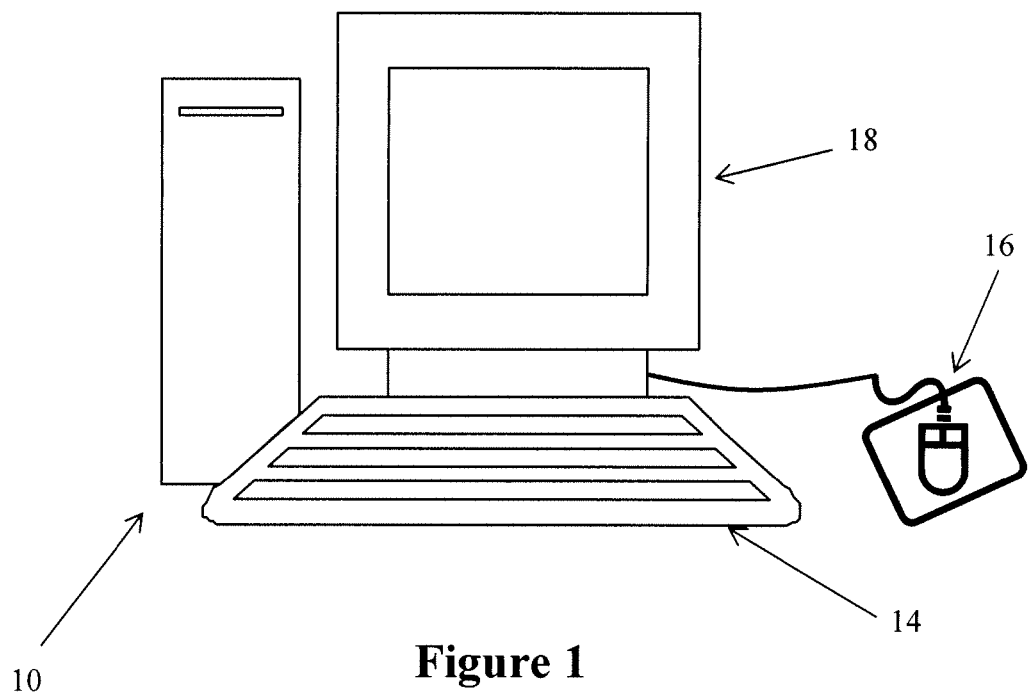
FIG. 1 is an illustration of an exemplary prior-art computing platform.

An example trusted platform 10 is illustrated in the diagram in FIG. 1. The computing platform 10 is shown as a so-called personal computer and is entirely conventional in appearance—it has associated the standard features of a keyboard 14, mouse 16 and visual display unit (VDU) 18, which provide the physical 'user interface' of the platform. The computing platform 10 is arranged to run a standard operating system such as Microsoft™ Windows XP™.

Figure 2:
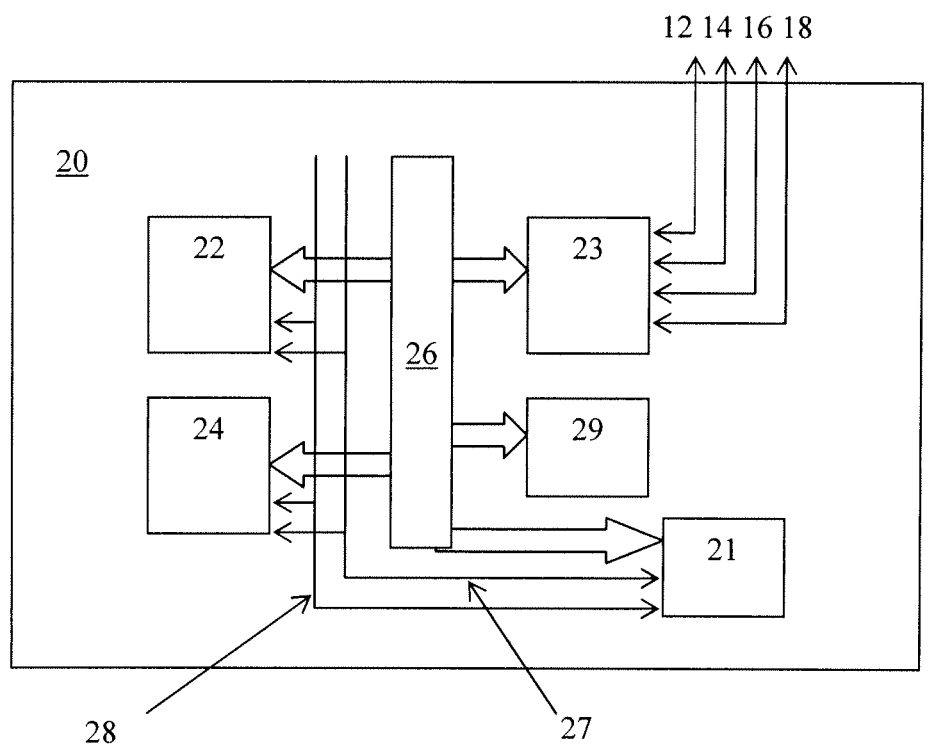
FIG. 2 indicates functional elements present on the motherboard of a prior-art trusted computing platform.

As illustrated in FIG. 2, the motherboard 20 of the trusted computing platform 10 includes (among other standard components) a main processor 21, main memory 22, a trusted entity here embodied in the form of trusted device 24 (such as a hardware TPM), a data bus 26 and respective control lines 27 and address lines 28, BIOS memory 29 containing the BIOS program for the platform 10, an Input/Output (IO) device 23, which controls interaction between the components of the motherboard and the keyboard 14, the mouse 16 and the VDU 18, and an I/O device 25, for example an Ethernet controller, for controlling communications with remote devices or systems. The main system memory 22 is typically random access memory (RAM). In operation, the platform 10 loads the operating system, in this case Windows XP™, into RAM from hard disk (not shown). Additionally, in operation, the platform 10 loads the processes or applications that may be executed by the platform 10 into RAM from hard disk (not shown). The mounting of the trusted device 24 on the mother board serves to bind it to the platform.

Typically, in a personal computer, the BIOS program is located in a special reserved memory area, such as the upper 64K of the first megabyte of the system memory (addresses FØØØh to FFFFh), and the main processor is arranged to look at this memory location first, in accordance with an industry wide standard. A significant difference between the trusted platform under discussion and a conventional platform is that, after reset, the main processor is initially controlled by CRTM code (which in the present example comprise hash function code stored in the trusted device 24) which then hands control over to the platform-specific BIOS program, which in turn initialises all input/output devices as normal. After the BIOS program has executed, control is handed over as normal by the BIOS program to an operating system program, such as Windows XP™, which is typically loaded into main memory 22 from a hard disk drive (not shown).

The main processor 21 is initially controlled by the CRTM code because it is necessary to place trust in the first measurement to be carried out on the trusted platform. The CRTM code is typically trusted at least in part because its provenance. As already indicated, the main processor 21 when under control of the CRTM forms the "root of trust for measurement" RTM. As is typical, one role of the RTM in the present case is to measure other measuring agents before these measuring agents are used and their measurements relied upon. The RTM is the basis for the aforementioned 'chain of trust'. Note that the RTM and subsequent measurement agents do not need to verify subsequent measurement agents; they merely measure and record them before they execute. This is called an "authenticated boot process". Valid measurement agents may be recognised by comparing a digest of a measurement agent against a list of digests of valid measurement agents. Unlisted measurement agents will not be recognised, and measurements made by them and subsequent measurement agents are deemed to be suspect.

Example Trusted Device

Further details will now be given of an implementation of the trusted device 24, it being understood that corresponding functionality can be provided in a software trusted entity (that is, virtual trusted device).

Figure 3:
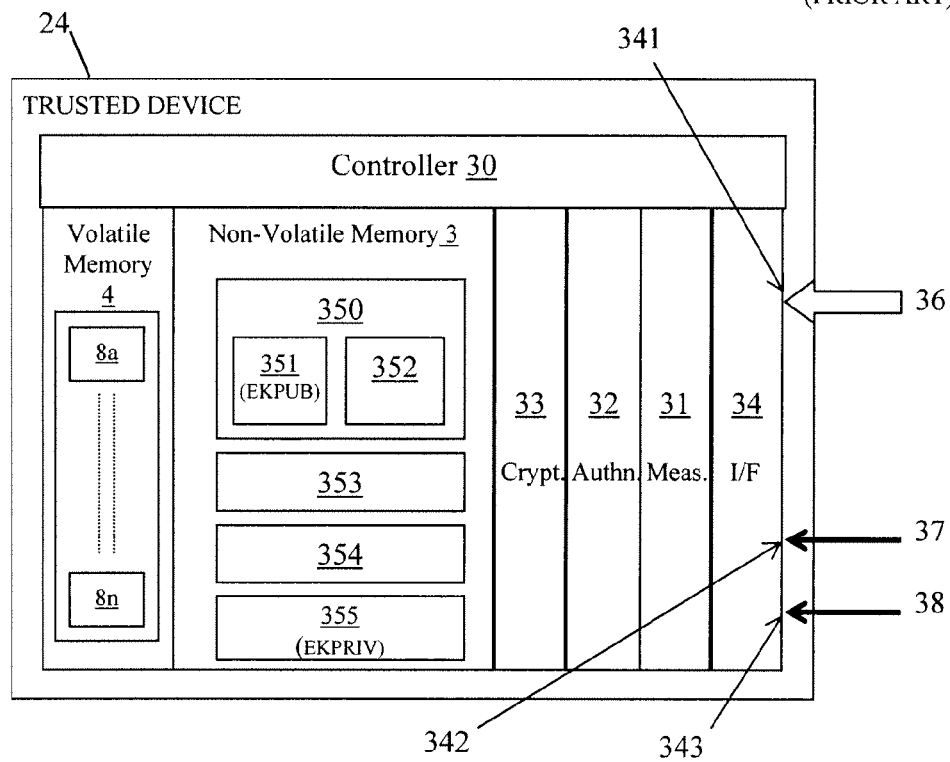
FIG. 3 indicates the functional elements of a prior-art trusted device of the trusted computing platform of FIG. 2.
Figure 4:
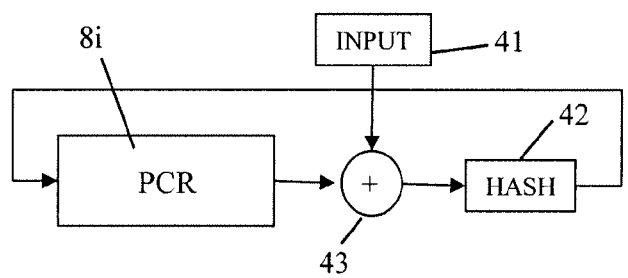
FIG. 4 illustrates the known prior-art process of extending values into a platform configuration register of the trusted device of FIG. 2.
Figure 5:
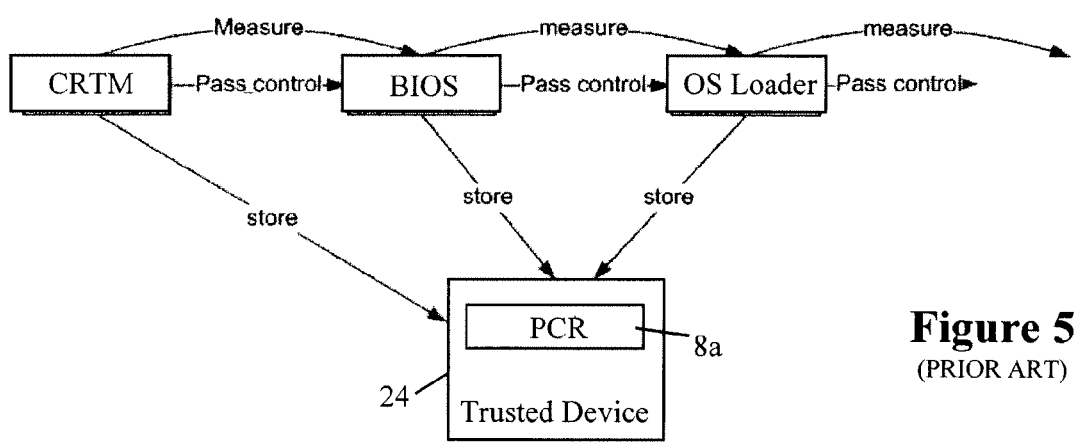
FIG. 5 illustrates the principle of transitive trust in a prior-art trusted computing platform.

The trusted device 24 comprises a number of blocks, as illustrated in FIG. 3. As already indicated, after system reset the trusted device 24 participates in an authenticated boot process to ensure that the operating state of the platform 10 is recorded in a secure manner. During the authenticated boot process, the trusted device 24 acquires at least one integrity metric of the computing platform 10. The trusted device 24 can also perform secure data transfer and, for example, authentication between it and a smart card via encryption/decryption and signature/verification. The trusted device 24 can also securely enforce various security control policies, such as locking of the user interface; in a particularly preferred arrangement, the display driver for the computing platform is located within the trusted device 24 with the result that a local user can trust the display of data provided by the trusted device 24 to the display—this is further described in the applicant's International Patent Application No. PCT/GB00/02005, entitled "System for Providing a Trustworthy User Interface" and filed on 25 May 2000, the contents of which are incorporated by reference herein.

Specifically, the trusted device 24 in the present embodiment comprises: a controller 30 programmed to control the overall operation of the trusted device 24, and interact with the other functions on the trusted device 24 and with the other devices on the motherboard 20; a measurement function 31 for acquiring a first integrity metric from the platform 10 either via direct measurement or alternatively indirectly via executable instructions to be executed on the platform's main processor; a cryptographic function 32 for signing, encrypting/decrypting specified data; an authentication function 33 for authenticating a smart card; and interface circuitry 34 having appropriate ports (36, 37 & 38) for connecting the trusted device 24 respectively to the data bus 26, control lines 27 and address lines 28 of the motherboard 20. Each of the blocks in the trusted device 24 has access (typically via the controller 30) to appropriate volatile memory areas 4 and/or non-volatile memory areas 3 of the trusted device 24. As has already been described, the trusted device 24 is designed, in a known manner, to be tamper resistant.

For reasons of performance, the trusted device 24 may be implemented as an application specific integrated circuit (ASIC). However, for flexibility, the trusted device 24 is preferably an appropriately programmed micro-controller. Both ASICs and micro-controllers are well known in the art of microelectronics and will not be considered herein in any further detail.

The non-volatile memory 3 of the trusted device 24 stores a private key 355 (PRIVEK) of an Endorsement key (EK) pair specific to the trusted device 24; preferably, the non-volatile memory 3 also stores a certificate 350 containing at least the public key 351 (PUBEK) of the Endorsement key pair of the trusted device 24 and an authenticated value 352 of at least one platform integrity metric measured by a trusted party (TP). The certificate 350 is signed by the TP using the TP's private key prior to it being stored in the trusted device 24. In later communications sessions, a user of the platform 10 can deduce that the public key belongs to a trusted device by verifying the TP's signature on the certificate. Also, a user of the platform 10 can verify the integrity of the platform 10 by comparing one or more acquired integrity metric(s) with the authentic integrity metric value(s) 352. If there is a match, the user can be confident that the platform 10 has not been subverted. Knowledge of the TP's generally-available public key enables simple verification of the certificate 350. The non-volatile memory 35 may also contain an identity (ID) label 353. The ID label 353 is a conventional ID label, for example a serial number, that is unique within some context. The ID label 353 is generally used for indexing and labeling of data relevant to the trusted device 24, but is insufficient in itself to prove the identity of the platform 10 under trusted conditions.

As already indicated, the trusted device 24 cooperates with other elements of the platform 10 to reliably acquire at least one integrity metric of the platform. In the present embodiment, a first integrity metric is acquired by having the main platform processor execute the CRTM code 354 that is stored in the non-volatile memory 3 trusted device 24; the CRTM when executed by the platform processor generates a digest of the BIOS instructions in the BIOS memory and passes it to the measurement function for storage. Such an acquired integrity metric, if verified as described above, gives a potential user of the platform 10 a high level of confidence that the platform 10 has not been subverted at a hardware, or BIOS program, level.

It would alternatively be possible to provide a measurement engine within the trusted device and have this engine form an integrity measurement on the BIOS code on platform start up (reset).

In the present example, the measurement function 31 has access to the non-volatile memory 3 (for accessing the CRTM hash code 354) and volatile memory 4 (for storing acquired integrity metric measurements). The trusted device 24 has limited memory, yet it may be desirable to store information relating to a large number of integrity metric measurements. This is done in trusted computing platforms as described by the Trusted Computing Group by the use of Platform Configuration Registers (PCRs) 8a-8n. The trusted device 24 has a number of PCRs of fixed size (the same size as a standard measurement digest)—on initialisation of the platform, these are set to a fixed initial value. Integrity measurements are then "extended" into PCRs by a process shown in FIG. 4. The PCR 8i value is concatenated 43 with the input 41 which is the value of the integrity measurement to be extended into the PCR. The concatenation is then hashed 42 to form a new 160 bit value. This hash is fed back into the PCR to form the new value of the integrity metric concerned. In addition to the extension of the integrity measurement into the PCR, to provide a clear history of measurements carried out the measurement process may also be recorded in a conventional log file (which may be simply in main memory of the computer platform). For trust purposes, however, it is the PCR value that will be relied on and not the software log.

Clearly, there are a number of different ways in which an initial integrity metric value may be calculated, depending upon the scope of the trust required. The measurement of the BIOS program's integrity provides a fundamental check on the integrity of a platform's underlying processing environment. The integrity metric measurement should be of such a form that it will enable reasoning about the validity of the boot process—the value of the integrity metric can be used to verify whether the platform booted using the correct BIOS. Optionally, individual functional blocks within the BIOS could have their own digest values, with an ensemble BIOS digest being a digest of these individual digests. This enables a policy to state which parts of BIOS operation are critical for an intended purpose, and which are irrelevant (in which case the individual digests must be stored in such a manner that validity of operation under the policy can be established).

It may also be noted that, preferably, the BIOS boot process includes mechanisms to verify the integrity of the boot process itself. Such mechanisms are already known from, for example, Intel's draft "Wired for Management baseline specification v 2.0—BOOT Integrity Service", and involve calculating digests of software or firmware before loading that software or firmware. Such a computed digest is compared with a value stored in a certificate provided by a trusted entity, whose public key is known to the BIOS. The software/firmware is then loaded only if the computed value matches the expected value from the certificate, and the certificate has been proven valid by use of the trusted entity's public key. Otherwise, an appropriate exception handling routine is invoked. Optionally, after receiving the computed BIOS digest, the trusted device 24 may inspect the proper value of the BIOS digest in the certificate and not pass control to the BIOS if the computed digest does not match the proper value—an appropriate exception handling routine may be invoked.

Once the BIOS code has been measured by the CRTM), the integrity metric measurement stored to a PCR, and the BIOS loaded, the BIOS preferably measures the next software component (such as OS loader) and causes a corresponding integrity metric measurement to be stored in the trusted device 24 before loading that software, and so on (see FIG. 5); in this way, a chain of trust ('transitive trust') can be built up to include the operating system and applications loaded by it, with corresponding integrity metrics being stored in the PCRs of the trusted device 24.

Other integrity checks may be carried out involving the measuring of program code and storing of a corresponding integrity metric measurement in the trusted device; for example, the CRTM or BIOS could be arranged to measure the BIOS programs associated with a SCSI controller to enable communications with peripheral equipment to be trusted. Other forms of integrity check may also be effected, for example memory devices or co-processors, on the platform could be verified by enacting fixed challenge/response interactions to ensure consistent results; these checks can also give rise to integrity metrics stored in the PCRs of the trusted device 24.

As will be clear from the foregoing, a large number of integrity measurement may be collected by measuring agents directly or indirectly measured by the RTM, and these integrity measurement extended into the PCRs of the trusted device 24. Some—many—of these integrity measurement will relate to the software state of the trusted platform. How the PCRs are allocated is preferably standardized for each platform type. By way of example, according to the TCG Specification for PC Clients, the PCRs are divided into two primary sets: the first set is designated for the platform's pre-OS environment (PCR[0-7]) and the other designated for the platform's OS (PCR[8-15]). In this case, the pre-OS PCRs provide the platform's initial chain of trust starting from platform reset; in other words, they establish a chain of trust from the CRTM through the OS's IPL (Initial Program Load) Code.

Changes to a software component after its initial measurement and loading result in the software component being re-measured and the resulting integrity measurement being passed to the trusted device to extend the PCR associated with that component.

Figure 6:
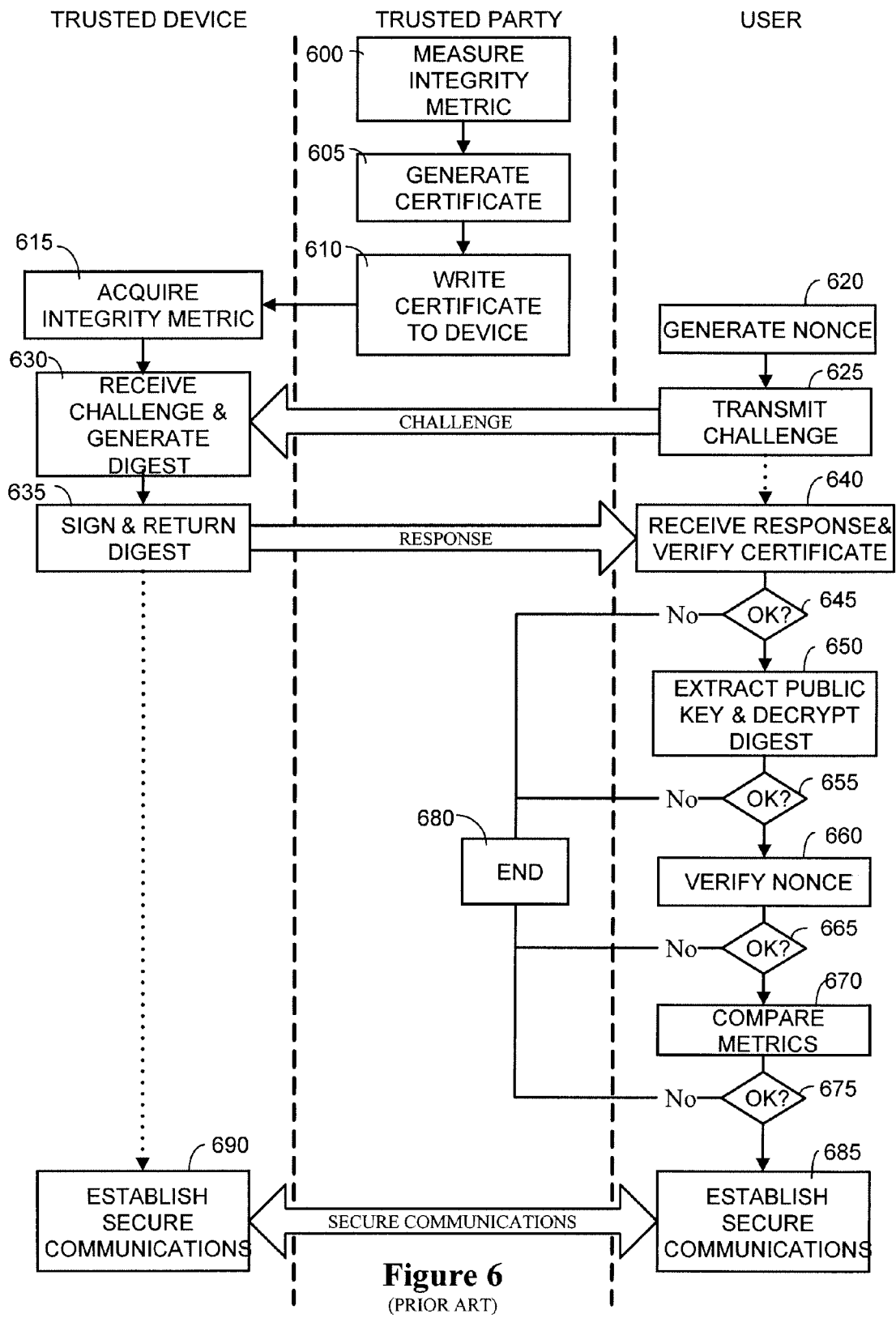
FIG. 6 illustrates a prior-art attestation protocol by which a trusted platform can demonstrate its integrity to another entity.

As already indicated, when a user wishes to communicate with the platform, he uses a challenge/response routine to challenge the trusted device 24 (the operating system of the platform, or an appropriate software application, is arranged to recognise the challenge and pass it to the trusted device 24, typically via a BIOS-type call, in an appropriate fashion). The trusted device 24 receives the challenge and creates an appropriate response based on the measured integrity metric or metrics—this may be provided with the certificate(s) giving expected integrity-metric value(s) and signed. This provides sufficient information to allow verification by the user. FIG. 6 illustrates in more detail the overall process by which a user (for example, of a remote platform) can verify the integrity of the trusted platform incorporating the trusted device 24.

As a preliminary step a trusted party TP, which vouches for trusted platforms, will have inspected the type of the platform to decide whether to vouch for it or not. This will be a matter of policy. If all is well, in step 600, the TP measures the value of integrity metric 352 of the platform. Then, the TP generates certificate 350, in step 605, for the platform. The certificate is generated by the TP by appending the trusted device's public key (EKPUB), and optionally its ID label, to the measured integrity metric, and signing the string with the TP's private key.

In step 610, the trusted device 14 is initialised by writing the certificate 30 into the appropriate non-volatile memory locations of the trusted device 24. This is done, preferably, by secure communication with the trusted device 14 after it is installed in the motherboard 10. The secure communications is supported by a 'master key', known only to the TP, that is written to the trusted device during manufacture, and used to enable the writing of data to the trusted device 24; writing of data to the trusted device 14 without knowledge of the master key is not possible.

At some later point during operation of the platform, for example when it is switched on or reset, in step 615, the trusted device 24 acquires and stores one or more integrity metrics of the platform in its PCRs.

When a user wishes to communicate with the platform, in step 620, he creates a nonce, such as a random number, and, in step 625, challenges the trusted device 24. The nonce is used to protect the user from deception caused by replay of old but genuine signatures (called a 'replay attack') by untrustworthy platforms. The process of providing a nonce and verifying the response is an example of the well-known 'challenge/response' process.

In step 630, the trusted device 24 receives the challenge and creates a concatenation of one, some or all of the measured integrity metrics (PCR values), the nonce, and optionally its ID label. Then, in step 635, the trusted device 24 signs the concatenation, using its private key EK, and returns the signed concatenation, accompanied by the certificate, to the user.

In step 640, the user receives the challenge response and verifies the certificate using the well known public key of the TP. The user then, in step 650, extracts the trusted device's 24 public key from the certificate and uses it to decrypt the signed concatenation from the challenge response. Then, in step 660, the user verifies the nonce inside the challenge response. Next, in step 670, the user compares the reported PCR values, which it extracts from the challenge response, with the authentic platform integrity metric value(s), which it extracts from the certificate. If any of the foregoing verification steps fails, in steps 645, 655, 665 or 675, the whole process ends in step 680 with no further communications taking place. It will be appreciated that authentic values for the PCRs can be obtained by the challenger in any suitable manner (for example, direct from a trusted party) and it is not necessary that these authentic values be provided through a certificate stored in the TPM.

Assuming all is well, in steps 685 and 690, the user and the trusted platform use other protocols to set up secure communications for other data, where the data from the platform is preferably signed by the trusted device 24.

Steps 620 to 675 constitute an attestation protocol (the procedure by which the a challenger can validate a platform based on TPM-signed PCR values). In fact, the attestation protocol is usually (though not necessarily) enhanced in at least two areas:

Firstly, rather than the TPM using its private Endorsement Key PRIVEK in step 635, it uses a short term private key that is part of a so-called Attestation Identity Key (AIK) pair; the reason for this is that, if only the EK is employed, it can be used to link transactions involving the TPM which is usually undesirable from a privacy viewpoint. The TPM is therefore preferably arranged to generate a succession of AIKs each of which is vouched for by a trusted party as belonging to a valid TPM (the trusted party vouches for the AIK by providing a signed certificate for the public part of the AIK). Other mechanisms (such as 'Direct Anonymous Attestation') can alternatively be used to provide TPM anonymity.

Secondly, the TPM reports not only one or more PCR values, but also a log of the measurements taken. This log (referred to as the Stored Measurement Log, SML) is created by the TPM to record in full the integrity measurements made, in the order they are made; this gives a much greater visibility as to what software has been loaded onto the platform than is provided by the PCR values which are digests of these measurements. The SML occupies a lot more memory than the PCR values and is therefore not stored in the TPM; however, secure storage of the SML is not required. The challenger, on receiving the SML can check the measurement values it contains with authentic values for the software concerned (these authentic values being obtained in any suitable manner); assuming the measurement values check out, they can then be used to compute expected values for the reported PCRs. The expected and reported PCR values are then compared and if they match then the platform state is validated. Use of the SML not only provides greater transparency but also greater efficiency since the number of authentic measurement values needed in any given environment (for example one for each software module loadable) is significantly less than the potential number of PCR values that could result (as latter number depends not only on the possible number of combinations of software modules loaded, but also on their order of loading).

Protected Storage—Sealing/Unsealing Data

As indicated above, a trusted entity such as the trusted device 24 may include trusted functionality (RTS) that provides a 'protected storage' mechanism for sealing data (typically keys or passwords) into an opaque blob held outside the trusted entity, the blob being subsequently accessible only when the platform is in a particular (trusted) state. This state is specified at the time of sealing by a digest of the values of some or all the PCRs. To unseal the data blob, the same digest must be formed from the current values of the PCRs. If the new digest is not the same as the digest in the opaque blob, then the user cannot recover the data.

Figure 7:
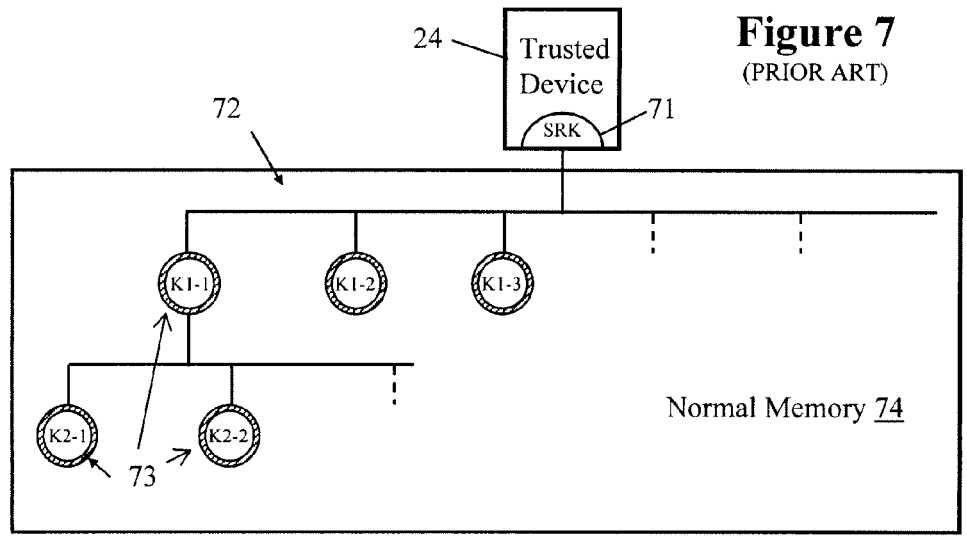
FIG. 7 is a diagram of a key hierarchy associated with a trusted entity.

One approach to implementing protected storage in the trusted device 24 will now be described, this approach being that used in TPMs. As illustrated in FIG. 7, in this approach, protected storage is implemented as a hierarchy (tree) 72 of data objects the root of which is a Storage Root Key (SRK) 71 that is permanently stored in the trusted device 24 (and not released from it). Apart from the SRK, the tree 72 can be stored outside of the trusted device in normal memory 74. When information in a node is used or revealed, the node is manipulated by the trusted device. Each intermediate node object in the tree is encrypted by a key in the node object above it in the tree (the parent node), all the way back to the SRK root node; in FIG. 7 two levels are shown below the SRK, namely a first level storing keys K1-1 to K1-3 and a second level storing keys K2-1 and K2-2, the encrypted nature of each key being indicated by the surrounding hatched annulus). Each key has an associated authorisation value that an entity wishing to make use of the key must present to the trusted device 24 (or, more accurately, used in a protocol that proves knowledge of the value without revealing the value) before the trusted device permits the key to be used. Intermediate nodes in the tree will always be keys but leaf nodes can be arbitrary data (though frequently they will also be keys, such as symmetric keys for use by application processes in protecting bulk data). Keys in the tree can either be "non-migratable" meaning that the private key is only known to the trusted device, or "migratable" meaning that there is no guarantee about the origin and use of the private key.

SECOND EXAMPLE

Prior-Art Trusted Platform

Assuming that integrity metrics are recorded for the operating system and applications loaded by the operating system, the above-described trusted platform 10 enables a user to check the state of the platform and decide whether or not to trust it. If the operating system has run an application that is not trusted by a first user (though possibly trusted by a different user), the first user can detect this (even after the application has terminated) by checking the relevant PCRs. However, in this case, for the above-described trusted platform, the only way for trust in the platform to be re-established for the first user is for the platform to be re-started. This drawback is multiplied where the platform is used to run a compartmented operating system supporting multiple computing environments since, unless appropriate measures are in place, running an un-trusted application in any of the environments requires the platform to be re-started to re-establish trust.

A solution to this is to provide a hardware/software architecture that enables the core software (BIOS & operating system/hypervisor) to be isolated from higher-level software so that if the latter is not trusted, it is only necessary to rebuild trust from the core software (assuming the latter is trusted). Where the core software supports multiple computing environments, then provided the latter are isolated from each other, an untrusted environment can be restarted without restarting the core software or the other computing environments supported by it. Furthermore, where multiple computing environments are supported, it is convenient to provide a respective trusted entity (typically a virtual trusted device) for each such environment.

An example trusted platform 80 supporting multiple isolated computing environments will now be briefly described with reference to FIG. 8. A fuller description of various forms of trusted platform of this type can be found in US published patent application US 2005/0223221, incorporated herein by reference.

Figure 8:
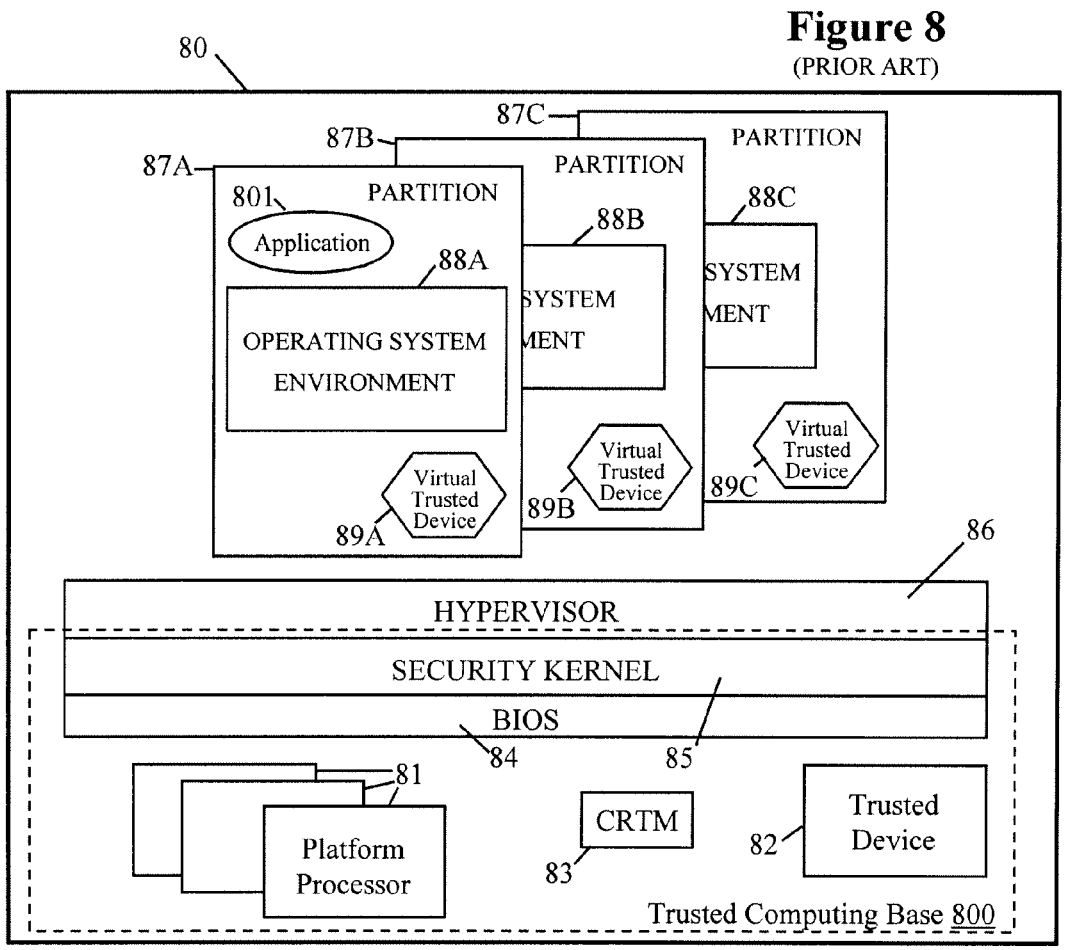
FIG. 8 is a diagram of a further prior-art computing platform running a hypervisor and providing for multiple isolated operating system environments.
Figure 9:
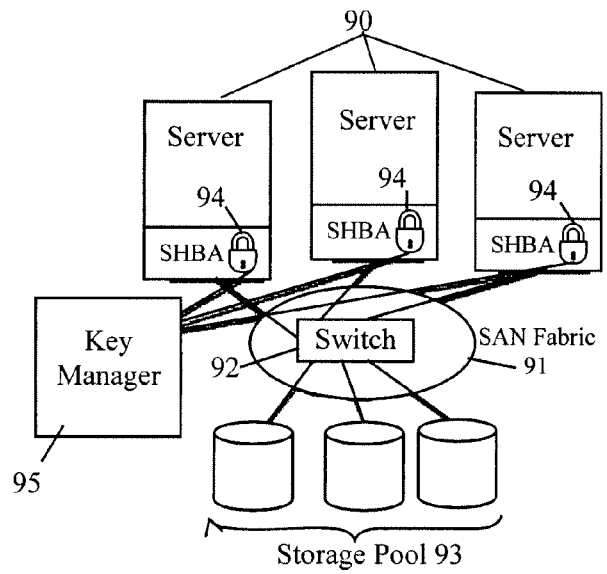
FIG. 9 is a diagram of a prior-art storage area network.
Figure 10:
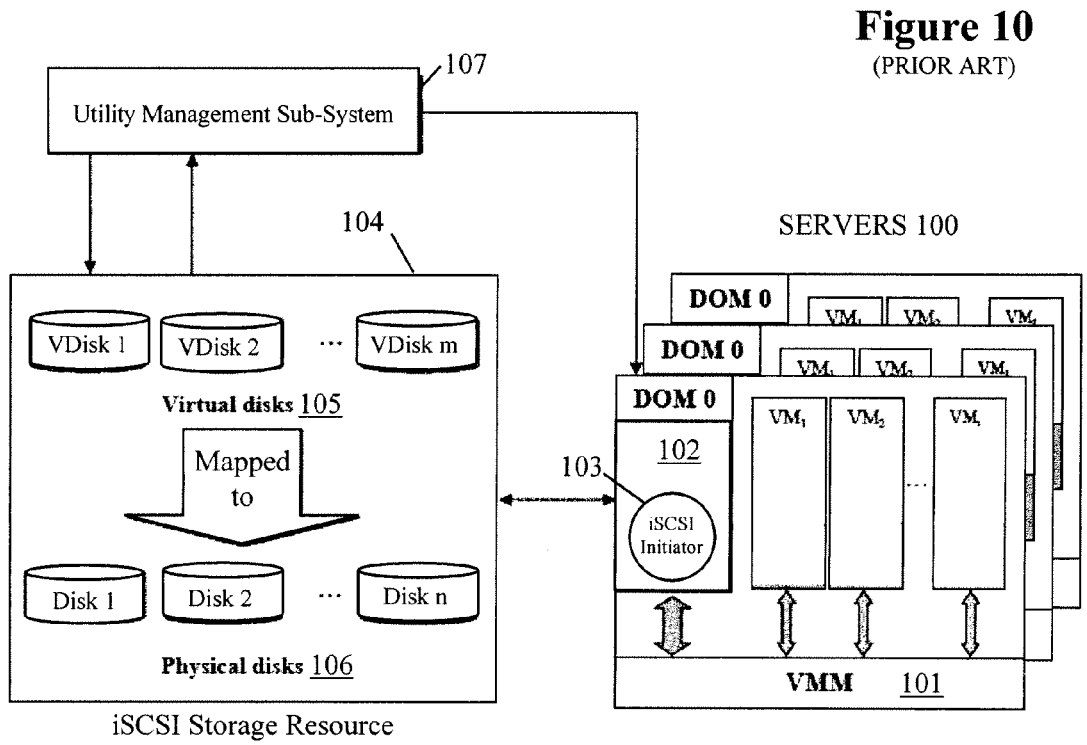
FIG. 10 is a diagram of a prior-art virtualized data center.

The trusted platform 80 shown in FIG. 8 has one or more platform processors 81 and a hardware trusted device 82 similar to the previously described trusted device 24 but with the code forming the CRTM being in a separate ROM 83. In equivalent manner to that described above for the platform 10 and trusted device 24, following a platform reset, the CRTM code is run by one of the main platform processor 81 to determine an integrity metric for the BIOS code (stored for example in the same ROM 83 as the CRTM) and pass the metric to the trusted device 82 for insertion into a PCR. Thereafter, the BIOS is loaded 84 which in turn measures and records in trusted device 82 an integrity metric of security kernel code before loading the security kernel 85; the security kernel 85 then measures and records in trusted device 82 an integrity metric of hypervisor code before loading the hypervisor 86 (also called a virtual machine monitor). In practice, there will typically be more integrity metrics recorded and intermediate code modules loaded. The elements 81 to 85 form the trusted computing base 800 of the platform 80. The hypervisor 86 may also be considered part of the trusted computing base with the proviso that for any complex program such as hypervisor 86, while it is possible to verify that the hypervisor code on the platform is identical to a reference version, it is very difficult to be sure that the reference version itself does not possess any security weaknesses.

The hypervisor 86 enables a plurality of operating system environments to be provided each in its own partition isolated from the other operating system environments; in FIG. 8, by way of example, three operating system environments 88A, 88B and 88C are shown, each in its own respective partition 87A, 87B, 87C; each partition may be arranged to execute on a different platform processor 81, thereby improving the degree of isolation. The hypervisor 86 enables and protects communications between the partitions and with the outside world. Applications are run as required in an appropriate one of operating system environment; in the present case one application 801 is shown running in operating system environment 88A.

Additional/alternative guarantees of separation of the partitions can be provided by using a main platform processor that provides multiple privilege levels. In this case the BIOS 84 and the security kernel 85 are, for example, run at the most privileged level of the main platform processor 81 while the hypervisor 86 is run at the second most privileged level of the main platform processor 81. All other code is run at a lower privilege level (applications typically run at the lowest privilege level, below that of the operating system environments) thus providing isolation of the BIOS 84, the security kernel 85 and the hypervisor 86 from potentially untrustworthy code.

It will be appreciated that, in effect, each partition 87A, 87B, 87C provides a virtual computing platform environment, which is substantially independent of (e.g. encapsulated or compartmentalised) other such computing environments. To a user, such an environment appears to behave in exactly the same way as a standard, standalone computing platform, even down to the ability to re-boot the platform: where a re-boot operation of a virtual computing platform re-boots only the resources available in the relevant partition (in other words, a re-boot operation would not have any effect on other virtual computing platforms).

In the present example, each partition 87A, 87B, 87C has its own associated virtual trusted device 89A, 89B, 89C (although shown in FIG. 8 in each partition, the virtual trusted devices are logically part of the security kernel and, for a main processor with privilege levels, can be run at the same privilege level as the security kernel or in a separate partition). The hardware trusted device 82 is responsible for storing integrity metrics of the code for the virtual devices and related trust functionality (such as virtual RTM). Thereafter, the virtual trusted device 89 of a partition is responsible for recording and reporting integrity metrics for the related operating system environment and any applications it is running. Each virtual trusted device has its own AIK(s) for signing its integrity metric reports; such an AIK is issued by a credible entity (which could be the hardware trusted device 82) on the basis of the integrity measures reported by the device 82 for the trusted computing base and the virtual trusted device code. A full report of the integrity metrics relevant to an application in a given partition is a combination of:

the integrity metrics for the trusted computing base and virtual trusted device code, signed by the hardware trusted device; and the integrity metrics of the application and its operating system environment, signed by the relevant virtual trusted device.

It will be appreciated that the isolation provided by the platform 80, minimises the software that must be re-started to re-establish trust in any particular partition. It will also be appreciated that the arrangement of having one hardware trusted device 82 for the trusted computing base 800 and one virtual trusted device per partition is merely one possibility among many, including just having a single hardware or virtual trusted device for all the platform.

The invention claimed is:

1. An apparatus comprising:
   a virtualized computing platform to provide a plurality of independent domains including:
      a first domain running an application virtual machine; and
      a second domain running a service driver to provide a secure service exclusively to the application virtual machine in the first domain, the service driver to carry out a key-based cryptographic operation as part of the secure service, with communication being permitted between the first and second domains;
the virtualized computing platform including:
a hardware trusted platform module to measure and report integrity metrics of program code installed on the platform;
a key manager to:
generate and store a cryptographic key specific to the provision of the secure service to the application virtual machine in the first domain;
release the key to the service driver in the second domain in response to receiving evidence of its identity and being satisfied of compliance with release policies associated with the key, wherein the policies comprise receipt of valid integrity metrics, signed by the hardware trusted platform module, for the service driver and code on which the service driver depends; and
the service driver to:
provide the secure service via the key; and
destroy a plain text form of the key in response to the key being used; and
the hardware trusted platform module comprising a sealing mechanism that makes the key inaccessible to an outside computing system.

2. The apparatus according to claim 1, wherein the service driver comprises:
a lightweight operating system; and
a key requester to request from the key manager the key for providing the secure service to the application virtual machine in the first domain.

3. The apparatus according to claim 1, wherein the service driver is arranged to identify itself to the key manager based on at least one identity key associated with the hardware trusted platform module.

4. The apparatus according to claim 1, further comprising:
the first and the second domains of the virtualized computing platform supported by a virtual machine monitor and coupled to a privileged domain running management code for configuring other domains and intercommunication between the first and the second domains and the other domains; and
the valid integrity metrics associated with the virtual machine monitor, the privileged domain, and the service driver.

5. The apparatus according to claim 4, wherein the valid integrity metrics are further associated with the application virtual machine running in the first domain for which the secure service is to be provided.

6. The apparatus according to claim 1, wherein the service driver is arranged, in response to receipt of the key from the key manager, to:
hold the key in unencrypted form while actively providing the secure service;
store a copy of the key in protected storage provided by the hardware trusted platform module; and
retrieve the key from protected storage in response to subsequently being called on by the application virtual machine to provide again the secure service.

7. The apparatus according to claim 1, wherein the key manager comprises a front-end component and a back-end component running in respective inter-communicating domains of a virtualized computing platform other than the first and the second domains, wherein
the front-end component includes a key request handler for receiving and responding to key requests from the service driver, and the back-end component includes a secure store for securely storing the key bound to its associated policies and data enabling identification of the service driver entitled to receive the key.

8. A method of providing a secure service implemented by a physical data processor executing machine-readable instructions, including a key-based cryptographic operation, to an application virtual machine running in a first domain of a virtualized computing platform, the method comprising:
establishing, in a second domain of the virtualized computing platform, a service driver for providing the secure service exclusively to the application virtual machine running in the first domain;
generating and storing in a key manager a key for use by the service driver in effecting said key-based cryptographic operation;
making the key inaccessible to an outside computing service using a hardware trusted platform module comprising a sealing mechanism;
providing the key from the key manager to the service driver in response to receiving evidence of its identity and valid integrity metrics, signed by trusted-device component of the virtualized computing platform, for the service driver and program code on which the service driver depends;
providing the secure service via the key; and
destroying a plain text form of the key in response to the key being used.

9. The method according to claim 8, wherein the service driver comprises:
a lightweight operating system; and
a key requester to request from the key manager the key for providing the secure service to the application virtual machine in the first domain.

10. The method according to claim 8, further comprising the service driver identifying itself to the key manager based on at least one identity key associated with the trusted device component of the virtualized computing platform.

11. The method according to claim 8, further comprising a virtual machine monitor supporting the first and the second domains, wherein:
the first and the second domains are coupled to a privileged domain running management code for configuring other domains and intercommunication between the first and the second domains and the other domains; and
the valid integrity metrics are associated with the virtual machine monitor, the privileged domain, and the service driver.

12. The method according to claim 11, wherein the valid integrity metrics are further associated with the application virtual machine running in the first domain for which the secure service is to be provided.

13. The method according to claim 8, further comprising:
in response to receipt of the key from the key manager, the service driver:
holding the key in unencrypted form while actively providing the secure service;
storing a copy of the key in protected storage provided by the trusted-device component; and
retrieving the key from protected storage in response to subsequently being called on by the application virtual machine to provide again the secure service.

14. The method according to claim 8, further comprising:
running a front-end component and a back-end component in respective inter-communicating domains of a virtualized computing platform other than the first and the second domains, wherein the key manager comprising the front-end component and the back-end component; and the front-end component receiving and responding to key requests from the service driver; and the back-end component securely storing the key bound to its associated policies and data enabling identification of the service driver entitled to receive the key.

15. The apparatus of claim 1, including the service driver to securely store a local copy of the key subsequent to the destruction of the plain text form of the key.

16. The apparatus of claim 1, including a utility management system to instruct a privileged domain to set up a number of customer-specific application virtual machines each in their own domains.

17. An apparatus, comprising:

a virtualized computing platform in communication with a utility management system, the virtualized computing platform comprising:

a privileged domain;

a first domain running an application virtual machine and including a guest operating system and a related application; and a second domain running a service driver and including:

a key requestor to:

request a cryptographic key from a key manager that generated and stored the cryptographic key; and manage the cryptographic key locally; and a service driver to:

provide a secure service via the key; and destroy a plain text form of the key in response to the key being used; and the key manager in communication with the virtualized computing platform to:

store the key specific to a provision of a secure service to the application virtual machine; and release the key to the service driver in response to satisfying particular release policies associated with the key; and the apparatus comprising a hardware trusted platform comprising a sealing mechanism that makes the key inaccessible to an outside computing system.

18. The apparatus of claim 17, the utility management system to specify keys used by secure services provisioned for users on the virtualized computing platform.

19. The apparatus of claim 17, wherein the application virtual machine comprises an untrusted component outside of control of data center management.

20. The apparatus of claim 17, the service driver to carry out a cryptographic key-based operation associated with the secure service.

* * * * *